United States Patent
Li et al.

(10) Patent No.: US 8,805,018 B2
(45) Date of Patent: Aug. 12, 2014

(54) METHOD OF DETECTING FACIAL ATTRIBUTES

(75) Inventors: Jianguo Li, Beijing (CN); Tao Wang, Beijing (CN); Yangzhou Du, Beijing (CN); Qiang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,310

(22) PCT Filed: Apr. 11, 2011

(86) PCT No.: PCT/CN2011/072597
§ 371 (c)(1),
(2), (4) Date: Sep. 16, 2013

(87) PCT Pub. No.: WO2012/139273
PCT Pub. Date: Oct. 18, 2012

(65) Prior Publication Data
US 2014/0003663 A1 Jan. 2, 2014

(51) Int. Cl.
*G06K 9/00* (2006.01)

(52) U.S. Cl.
USPC .......................................................... 382/103

(58) Field of Classification Search
CPC .......... G06K 9/00221; G06K 9/00228; G06K 9/00234; G06K 9/00241; G06K 9/00248; G06K 9/00255
USPC .......................................................... 382/103
See application file for complete search history.

(56) References Cited

U.S. PATENT DOCUMENTS

| | | | | |
|---|---|---|---|---|
| 5,642,431 | A | * | 6/1997 | Poggio et al. .................. 382/118 |
| 6,016,148 | A | | 1/2000 | Kang et al. |
| 6,031,539 | A | | 2/2000 | Kang et al. |
| 7,127,087 | B2 | * | 10/2006 | Huang et al. ................... 382/118 |
| 7,417,727 | B2 | * | 8/2008 | Polonskiy et al. ............. 356/300 |
| 7,447,338 | B2 | * | 11/2008 | Kim ............... 382/118 |
| 7,689,011 | B2 | * | 3/2010 | Luo et al. ...................... 382/118 |
| 8,055,018 | B2 | * | 11/2011 | Han et al. ...................... 382/103 |

FOREIGN PATENT DOCUMENTS

| KR | 20070117922 A | 12/2007 |
|---|---|---|
| WO | 2012/139273 A | 10/2012 |

OTHER PUBLICATIONS

International Preliminary Report on Patentability received for International Application No. PCT/CN2011/072597, completion on Jul. 2, 2013, 4 pages.
International Search Report and Written Opinion received for International Application No. PCT/CN2011/072597, mailed on Jun. 23, 2011, 7 pages.

(Continued)

*Primary Examiner* — Tom Y Lu
(74) *Attorney, Agent, or Firm* — Schwabe, Williamson & Wyatt, P.C.

(57) ABSTRACT

Detection of a facial attribute such as a smile or gender in a human face in an image is performed by embodiments of the present invention in a computationally efficient manner. First, a face in the image is detected to produce a facial image. Facial landmarks are detected in the facial image. The facial image is aligned and normalized based on the detected facial landmarks to produce a normalized facial image. Local features from selected local regions are extracted from the normalized facial image. A facial attribute is predicted in each selected local region by inputting each selected local feature into a weak classifier having a multi-layer perceptron (MLP) structure. Finally, output data is aggregated from each weak classifier component to generate an indication that the facial attribute is detected in the facial image.

23 Claims, 10 Drawing Sheets

(56) References Cited

OTHER PUBLICATIONS

Dalal et al., "Histograms of Oriented Gradients for Human Detection", INRIA Rh•one-Alps, 655 avenue de l'Europe, Montbonnot 38334, France, 2005, pp. 1-8.

Deniz et al., "Smile Detection for User Interfaces", First and last authors: Universidad de Castilla-La Mancha, E.T.S.I.I Campus Universitario, Avda. Camilo Jose Cela s/n, 13071, Spain, 2008, pp. 602-611.

Makinen et al., "Evaluation of Gender Classification Methods with Automatically Detected and Aligned Faces", IEEE Transactions on Pattern Analysis and Machine Intelligence, vol. 30, No. 3, Mar. 2008, pp. 541-547.

Ojala et al., "Multiresolution Gray-Scale and Rotation Invariant Texture Classification with Local Binary Patterns", IEEE Transactions on Pattern Analysis and Machine Intelligence, vol. 24, No. 7, Jul. 2002, pp. 971-987.

Bobadavies et al., "The Open Computer Vision Library", Download Open Computer Vision Library software for free at 'SourceForge_net.mht', retreived on Sep. 24, 2013, 1 page.

Sony, "Sony's Cyber-shot T200 gets its first review—Engadget", retreived from 'Sony's Cyber-shot T200 gets its first review—Engadget.mht', on Sep. 24, 2013, 1 page.

Viola et al., "Rapid Object Detection using a Boosted Cascade of Simple Features", Accepted Conference on Computer Vision and Pattern Recognition, 2001, pp. 1-9.

Whitehill et al., "Toward Practical Smile Detection", IEEE Transactions on Pattern Analysis and Machine Intelligence, vol. 31, No. 11, Nov. 2009, pp. 2106-2111.

\* cited by examiner

METHOD OF DETECTING FACIAL ATTRIBUTES

FIELD

The present disclosure generally relates to the field of image processing. More particularly, an embodiment of the invention relates to facial attributes detection processing executed by a processor in a processing system for analyzing facial images.

BACKGROUND

With the advancement of increased computing power, face recognition applications are becoming more and more popular, e.g., Auto focus/Auto white balance/Auto exposure (3A) processing and smile shutter in digital cameras, avatar-based communications on smart phones, face recognition login capabilities on handheld computing devices, and so on. In these facial analysis applications, it may be desirable to detect facial attributes. Facial attributes may include whether a face is smiling or not, whether a face is the face of as man or a woman, whether the eyes are closed or not, or whether a face belongs to a child, young adult, middle aged adult, or a senior citizen. Other facial attributes may also be detected. Facial attribute detection has many usages. For instance, smile detection can be used as a smile shutter activation in camera imaging, or used as a mood detection capability in an automated favorite advertising survey. Gender detection can be used in automated advertising selection for smart digital signage. Facial attribute detection can also be used in other areas such as video surveillance, visual search, and content analysis, etc. Thus, fast and efficient techniques for detection of facial attributes in facial images are desired.

BRIEF DESCRIPTION OF THE DRAWINGS

The detailed description is provided with reference to the accompanying figures. The use of the same reference numbers in different figures indicates similar or identical items.

DETAILED DESCRIPTION

Embodiments of the present invention provide for fast and accurate detection of facial attributes (such as smile/mood, gender, age, blink, etc.) in an image, which may be used in camera imaging, digital signage and other applications. Embodiments of the present invention achieve state-of-the-art accuracy (96% in smile detection, 94% in gender detection, etc., in one test), require very small memory usage (less than 400 KB), and execute quickly (more than 800 faces per second detection on a processing system having a 1.6 GHz Atom processor in one test).

Embodiments of the present invention comprise a unified framework for facial attribute detection. Embodiments provide at an several advantages over known facial attribute detection implementations, such as for smile detection and gender detection. First, embodiments of the present invention provide for a unified and general technique which works well for detection of all facial attributes with high accuracy, while the known techniques are only applicable for one specific facial attribute category. Second, the present method has very small memory and computing resource requirements. Therefore, facial attribute detection according to embodiments may be applied to a variety of computing platforms from a personal computer (PC) to embedded devices.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be perforated using various means, such as integrated semiconductor circuits ("hardware"), computer-readable instructions organized into one or more programs stored on a computer readable storage medium ("software"), or some combination of hardware and software. For the purposes of this disclosure reference to "logic" shall mean either hardware, software (including for example micro-code that controls the operations of a processor), firmware, or some combination thereof.

Figure 1:
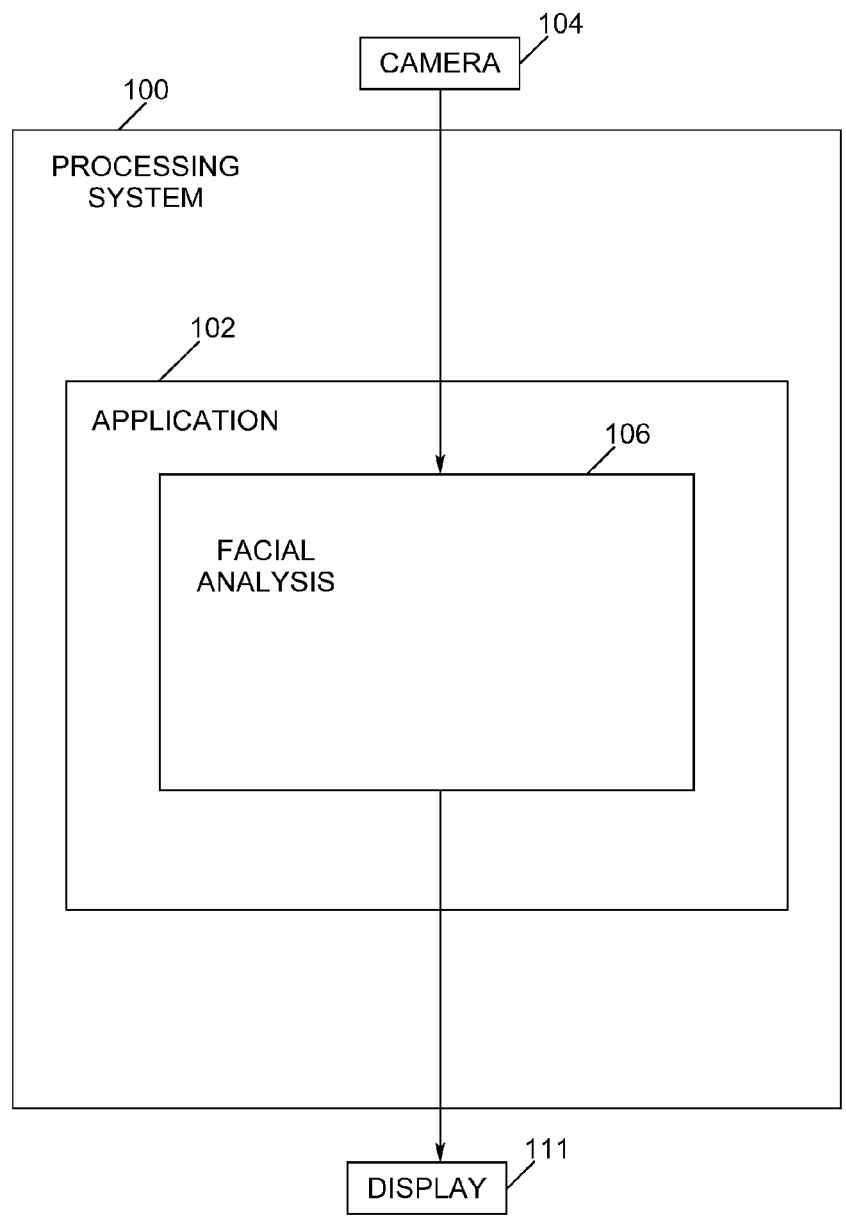
FIG. 1 is a diagram of a facial image processing system according to an embodiment of the present invention.

Embodiments of the present invention process face images captured from a camera or previously stored in as processing system. FIG. 1 is a diagram of a processing system 100 in accordance with some embodiments of the invention. Processing system includes application 102, camera 104, and display 111. In various embodiments, the processing system may be a personal computer (PC), a laptop computer, as netbook, a tablet computer, a handheld computer, a smart phone, a mobile Internet device (MID), or any other stationary or mobile processing device. In some embodiments, the camera may be integral with the processing system. The camera may be a still camera or a video camera. In other embodiments, the camera may be external to the processing system but communicatively coupled with the processing system. In an embodiment, images captured by a camera may be communicated over a network, or wired or wireless interface, to the processing system for analysis. Application 102 may be an application program to be executed on the processing system. In various embodiments, the application program may be a standalone program, or is part of another program (such as a plug-in, for example), for a web browser, image processing application, game, or multimedia application, for example. Application 102 may include facial analysis component 106 to analyze images captured by the camera to detect human faces. In an embodiment, application 102 and/or facial analysis component 106 may be implemented as a hardware component, firmware component, software component, or combination of one or more of hardware, firmware, and/or software components, as part of processing system 100.

In an embodiment, a user may operate processing system 100 to capture one or more images from camera 104. The captured one or more images may be input to application 102 for various purposes. Application 102 may pass the one or more images to facial analysis component 106 for determining facial characteristics in the one or more image. In an embodiment, facial analysis component 106 may detect facial attributes in the one or more images. Results of application processing, including facial analysis, may be shown on display 111.

Figure 2:
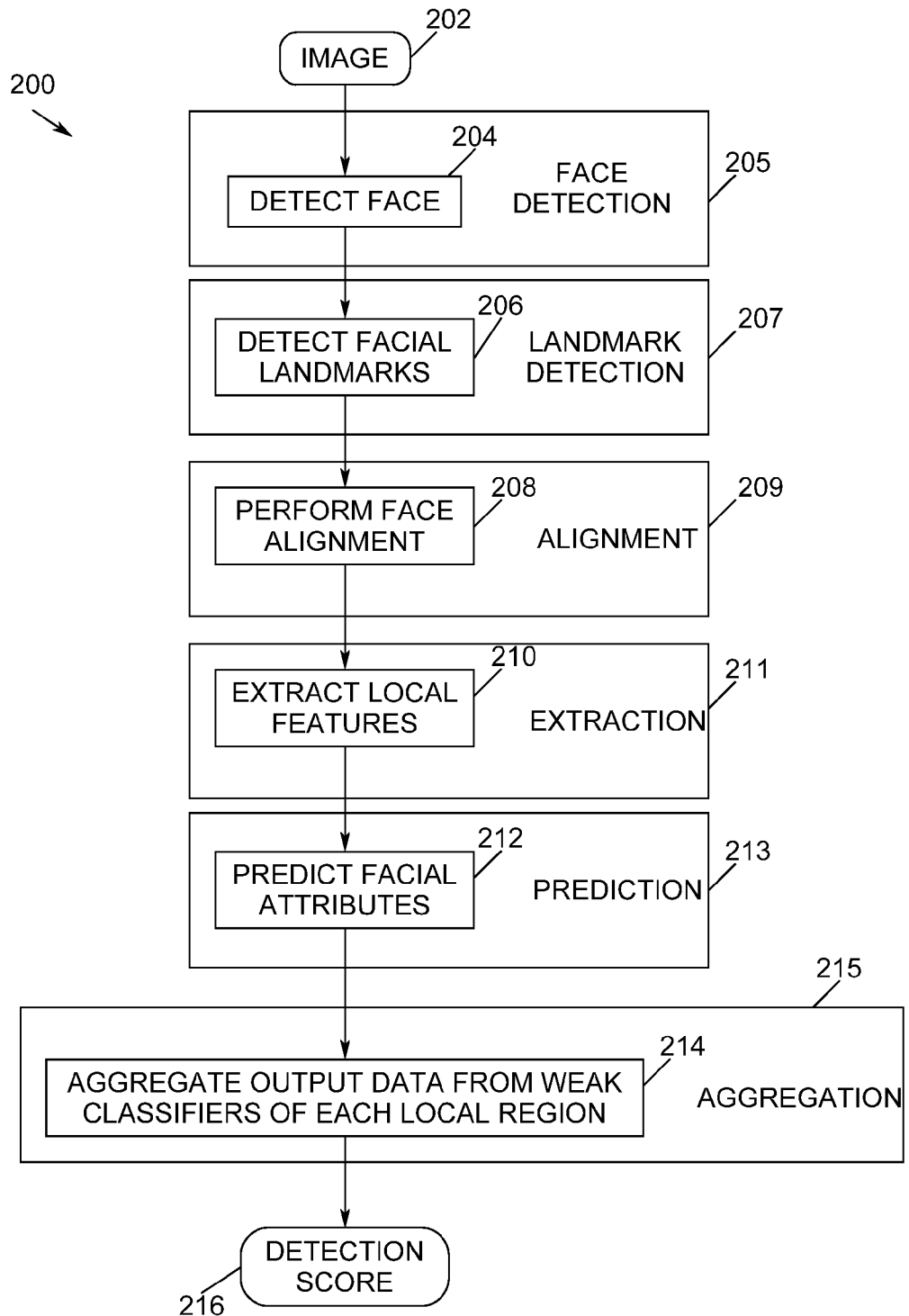
FIG. 2 is a diagram of facial analysis processing according to an embodiment of the present invention.

FIG. 2 is a diagram of facial analysis processing 200 performed by facial analysis component 106 according to an embodiment of the present invention. An image 202 may be input to the facial analysis process. At block 204, a face may be detected in the image by performing a face detection process by face detection component 205 to locate a face rectangle region for each detected face in the image. At block 206, facial landmark may be detected in each face rectangle region by performing a facial landmark detection process by landmark detection component 207. In an embodiment, the facial landmarks comprise six points: the corners of the eyes and mouth. At block 208, the face rectangle region may be aligned and normalized by a face alignment process in alignment component 209 based at least in part on the detected facial landmarks to a predetermined size. In one embodiment, the resulting size of the aligned and normalized image may be less than the size of the facial image. In an embodiment, the size is 64 pixels by 64 pixels. At block 210, local features may be extracted from selected local regions of the normalized face images by extraction component 211. A local region is a subset of a normalized face image. In an embodiment, a local region may be converted to a set of numbers by a transformation process. In one embodiment, a local binary patterns (LBP) process may be used as a feature extractor. In another embodiment, a histogram of orient gradient (HoG) process may be used as a feature extractor. In other embodiments, other feature extraction processes may be used. In an embodiment, a local feature is as set of these numbers that represents a local region. At block 212, each local region is represented by the extracted local features, and the extracted local features may be inputted to a weak classifier component based on a multi-layer perceptron (MLP) structure for prediction of a selected facial attribute by prediction component 213. At block 214, output data from the weak classifier for each local feature may be aggregated as a final detection score 214 by aggregation component 215. In an embodiment, the final detection score may be an indication as to whether the facial attribute is detected in the image, the final detection score being in a range of 0.0 to 1.0, where the large the value, the higher the confidence in detecting a selected facial attribute.

Face detection processing 204 may be performed on an input image to met a face in the image. In an embodiment, any known face detection process may be used as long as the face detection process produces a rectangle image of the detected face. The input data comprises one or more 2D images. In an embodiment, the 2D image is a still image. In another embodiment, the 2D images comprise a sequence of video frames at a certain frame rate fps with each video frame having an image resolution (W×H). In an embodiment, an existing face detection approach following the well known Viola-Jones framework as shown in "Rapid Object Detection Using a Boosted Cascade of Simple Features," by Paul Viola and Michael Jones, Conference on Computer Vision and Pattern Recognition, 2001, may be used.

Figure 3:
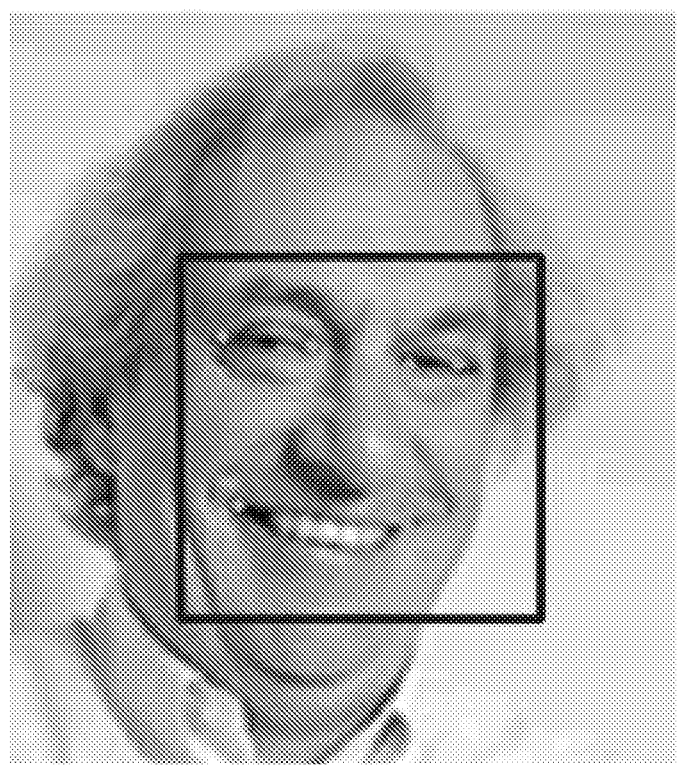
FIG. 3 is an example of detected facial landmarks in facial image according to an embodiment of the present invention.

After locating the face regions, embodiments of the present invention detect accurate positions of facial landmarks, such as the mouth, and corners of the eyes. A landmark is a point of interest within a face. The left eye, right eye, and nose base are all examples of landmarks. In an embodiment, facial landmark detection processing 206 may be performed as disclosed in the co-pending patent application Ser. No. 13/997, 296 entitled "Method of Facial Landmark Detection," by Ang Liu, Yangzhou Du, Tao Wang, Jianguo Li, Qiang Li, and Yimin Zhang, commonly assigned to the assignee of the present application. FIG. 3 is an example of detected facial landmarks in a facial image according to an embodiment of the present invention. The rectangle region denotes the detected face as a result of facial detection processing 204 and the diamonds indicate the six detected facial landmarks as a result of facial landmark detection processing 206.

During face alignment processing 208, the detected faces may be converted to gray-scale, aligned and normalized to a pre-defined size, such as 64×64 (64 pixels in width and height). In an embodiment, the alignment may be done in the following steps:

Compute the rotation angle $\theta$ between eye-corner lines and a horizontal line;

Rotate the image angle $\theta$ to make the eye-corner parallel to horizontal line;

Compute the distance between the two eye-centers (w) and the eye-to-mouth distance (h);

Crop a (2 w×2 h) rectangle from the face region, to make the left eye center at (0.5 w, 0.5 h), the right eye center at (1.5 w, 0.5 h), and the mouth center at (w, 1.5 h).

Scale the cropped rectangle to the pre-defined size (such as 64×64).

Figure 4:
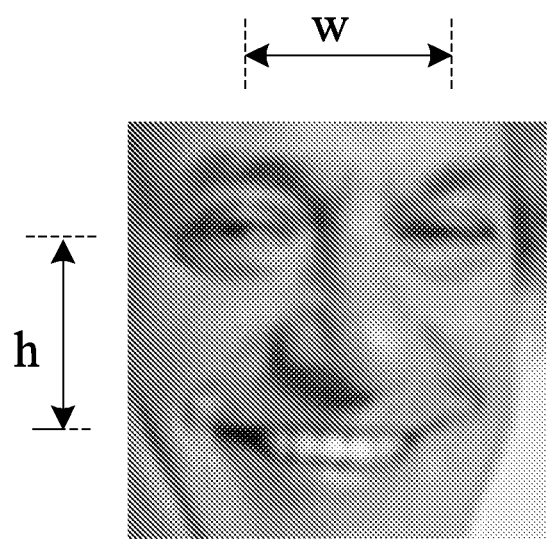
FIG. 4 is an example of alignment and formalization of a selected portion of an example facial image according to an embodiment of the present invention.

To alleviate lighting difference among images, the scaled image may be histogram equalized. FIG. 4 is an example of alignment and normalization of as selected portion of the facial image according to an embodiment of the present invention.

Figure 5:
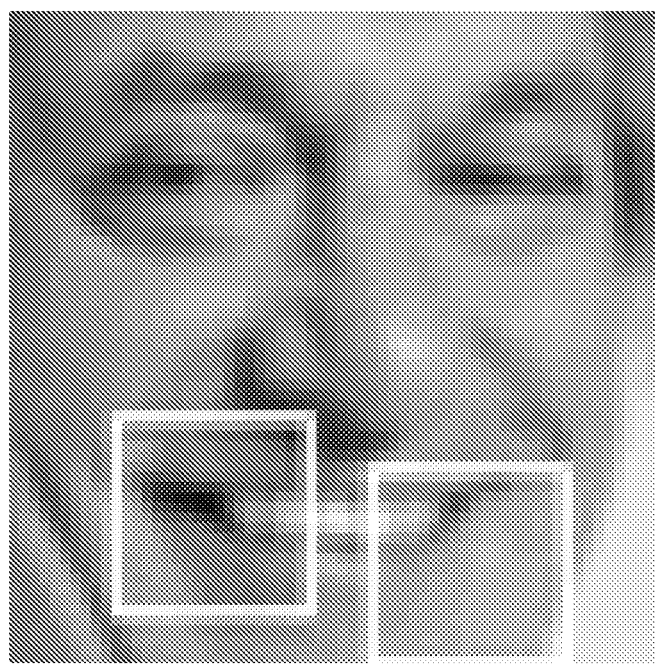
FIG. 5 is an example of selected local regions for smile detection according to an embodiment of the present invention.
Figure 6:
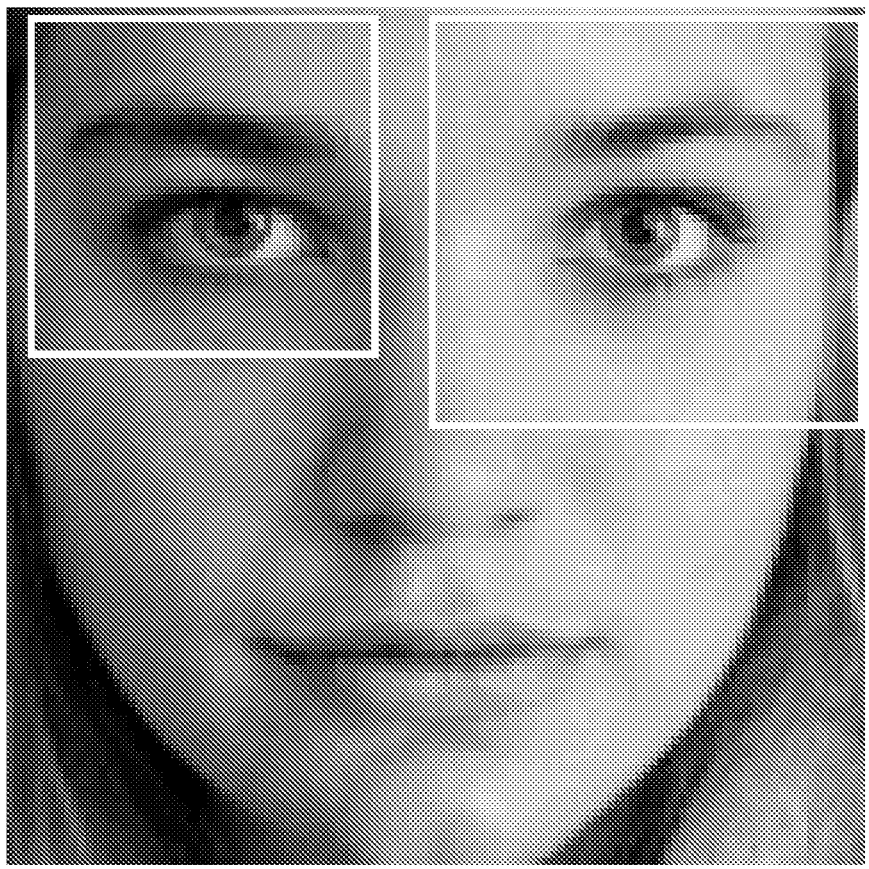
FIG. 6 is an example of selected local regions for gender detection according to an embodiment of the present invention.

Local feature extraction processing 210 may be performed as follows. Local features may be extracted from local regions of aligned and normalized facial images. In one embodiment, the local features may be represented as a Local Binary Patterns (LBP) histogram. A suitable LBP technique is disclosed in "Multiresolution Gray-Scale and Rotation Invariant Texture Classification with Local Binary Patterns," by T. Ojala, M. Pietkainen, and T. Maenpaa, in IEEE Transactions on Pattern Analysis and Machine Intelligence (PAMI), 2002, pages 971-987. In another embodiment, the local features may be represented as a Histogram of oriented Gradients (HoG). A suitable HoG technique is disclosed in "Histograms of oriented Gradients for Human Detection," by N. Dala and B. Triggs, in IEEE Conference on Computer Vision and Pattern Recognition (CVPR), 2005. In other embodiments, other feature extraction techniques may be used. In various embodiments of the present invention, the technique used for extracting local features may be different for different facial attributes. For instance, when performing smile detection, LBP is preferred over other techniques; when performing gender or age detection, HoG is preferred over other techniques. FIG. 5 is an example of selected local regions for smile detection according to an embodiment of the present invention. FIG. 6 is an example of selected local regions for gender detection according to an embodiment of the present invention.

A local region may be defined as a quadruple (x, y, w, h) where (x, y) is the top-left corner point of the local region, and (w, h) are the width and height of the rectangle of the local region. There are many possible local regions within a normalized facial image. In embodiments of the present invention, a boosting process may be used to select differentiated regions for facial attribute detection from a training dataset.

In a training procedure, a size-sealable window is slid over the normalized facial image to generate candidate local regions. Taking a 64×64 normalized facial image as an example, in an embodiment, one may start with 16×16 window, and step every 4 pixels in the face image. The window size may then be increased by 4 pixels (such as from a 16×16 window to a 20×20 window), when the previous scan is finished.

There are approximately several hundred candidate windows (local regions) which may be identified according to this scheme when the normalized facial image is 64 pixels by 64 pixels. However, only a few local regions may be useful for the final classification. The boosting algorithm may be adopted to simultaneously select a subset of useful local regions from these candidate local regions and train weak classifiers from the local region based representation. The boosting training procedure is listed in Table 1.

TABLE 1

Boosting procedure for local region selection and weak classifier training

Input: Candidate local region $\{R_i\}_{i=1}^{L}$;
    Training face image set, N face images and corresponding labels y;
    (in smile detection, = 1 for smiling, −1 for non-smile)
    Suppose $N_a$ positive faces, and $N_b$ negative faces
Step 1: for N face images, extract local features (such as LBP for smile) in each local region $R_i$.
Step 2: Initial weight for each training samples
    $W(x_j) = 1/N_a$ if $y_j = 1$
    $W(x_j) = 1/N_b$ otherwise
Step 3: for k = 1:K//boosting round
1) Sampling with N samples according to the weight W(.) to get a subset
2) For each local region $R_i$.
    a) represent face image with LBP histogram feature in local region;
    b) train an MLP classifier on the formulated subset
    c) output total prediction error $\epsilon_i$
3) Pick the local region with the lowest prediction error as current round classifier $C_k(x)$
4) Use $C_1(x)\sim C_k(x)$ to predict all training samples
5) Aggregating 1~k-th round classifier together $$\overline{C}(x) = \frac{1}{k}\sum_{n=1}^{k} C_n(x)$$

Suppose $c_{kj} = \overline{C}_k(x_j)$ indicates the aggregating classifier output for sample j,
    The total error of the aggregating classifier on the training set is $\overline{\epsilon}_k$
    Update the sampling weight by following formula $$\alpha = \log\left(\frac{1+\overline{\epsilon}_k}{1-\overline{\epsilon}_k}\right)$$

$W(x_j) = W(x_j) \exp(-\alpha c_{kj})$ if correct predicted
    $W(x_j) = W(x_j) \exp(\alpha c_{kj})$ otherwise
7) Check whether $\overline{\epsilon}_k$ is converged or not
Output: $C_1(x)\sim C_K(x)$ and corresponding selected regions.
Given a test sample, the final prediction classifier is $$\overline{C}(x) = \frac{1}{K}\sum_{n=1}^{K} C_n(x)$$

For each extracted local feature, in an embodiment, a classifier is trained to perform the weak classification. In embodiments of the present invention, the base classifier used is a multi-layer perception (MLP), rather than support vector machines (SVM). A multi-layer perceptron (MLP) is a feed-forward artificial neural network model that maps sets of input data onto a set of appropriate output data. An MLP consists of multiple layers of nodes in a directed graph, with each layer fully connected to the next one. Except for the input nodes, each node is a neuron (or processing element) with a nonlinear activation function. MLP utilizes a supervised learning technique called back-propagation for training the network. MLP is a modification of the standard linear perceptron, which can distinguish data that is not linearly separable.

In embodiments of the present invention, MLP is used due to several aspects. MLP can provide similar performance to state-of-the-art SVM based algorithms. The model size of MLP is much smaller than SVM since MLP only stores network weights as models while SVM stores sparse training samples (i.e., support vectors). The prediction of MLP is very fast since it only contains vector product operations. MLP directly gives probability and score outputs for prediction confidence.

Figure 7:
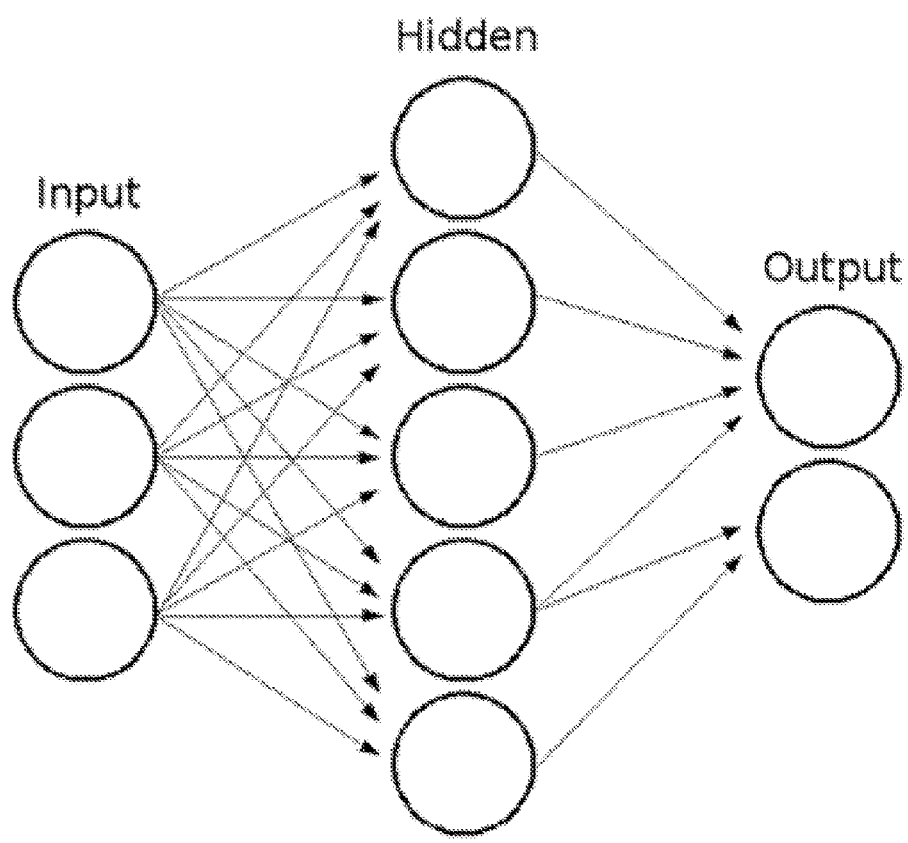
FIG. 7 is a diagram of the structure of a multi-lay perceptron (MLP) according to an embodiment of the present invention.

MLP is the most commonly used type of neural network. In an embodiment of the present invention, the MLP comprises an input layer, an output layer and one hidden layer. Suppose there are d nodes at the input layer (where d is the dimension of local features, such as 59 for a LBP histogram); two nodes at the output layer (for smile detection, the two nodes indicate the prediction for smiling or non-smiling, for gender detection, the two nodes indicate the prediction for male or female), while the number of nodes in the hidden layer is a tuned parameter and determined by the training procedure. FIG. 7 is a diagram of the structure of a multi-layer perceptron (MLP) according to an embodiment of the present invention.

Figure 8:
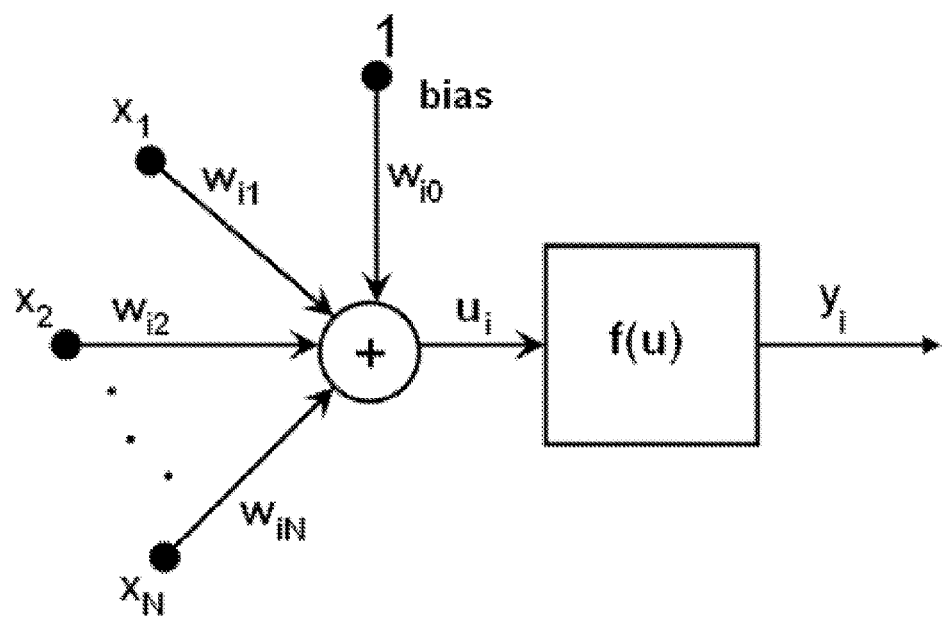
FIG. 8 is a diagram of a computing model at each node of the MLP according to an embodiment of the present invention.

In an embodiment, all of the nodes (neurons) in the MLP are similar. The MLP takes the output values front several nodes in the previous layer on input, and passes the responses to neurons in the next layer. The values retrieved from the previous layer may be summed with trained weights for each node, plus a bias term, and the sum may be transformed using an activation function $f$. FIG. 8 illustrates the computing architecture of each node.

The active function $f$ may be a sigmoid function, for instance $f(x)=e^{-xa}/(1+e^{-xa})$. The output of this function is in the range 0.0 to 1.0. It is apparent that at each node, the computation is a vector product between a weight vector and an input vector from the previous layer, mathematically $y=f(w \cdot x)$ where w is the weight vector and x is the input vector. These computations can be accelerated by using single instruction, multiple data (SIMD) instructions or other accelerators. Hence, the classification by the MLP is very efficient.

As described above, the MLP may be used as a weak classifier for each selected local feature. Each selected local feature will associate with one MLP classifier. Each MLP classifier outputs a value between 0.0 and 1.0 indicating the likelihood that the selected local feature detects the selected facial attribute (e.g., smile detection, gender detection, etc.).

In an embodiment, the final classification may be determined by aggregation processing 214 based on an aggregating rule:
Given a test sample x;
For each selected local region k, extract local features $x_k$ at that local region, then use a weak MLP classifier $C_k(\chi_k)$ to do the prediction;
The final output is the aggregated result $$\overline{C}(x) = \frac{1}{K}\sum_{n=1}^{K} C_n(x)$$

In an embodiment, arithmetic mean is used for the aggregation, however, in other embodiments other techniques may be used, such as a weighted average. In an embodiment, the final detection score may be shown on the display along with the facial image, and/or used in processing by the application or other components of the processing system.

The applicants implemented an embodiment of the present invention in the C/C++ programming language on a X86- based computing platform for smile/gender/age detection processing. Testing of smile detection was performed on the GENKI public dataset (which contains 2,000 smiling faces and 2,000 non-smiling faces), and compared with existing techniques such as a global-feature based method and a Haar-cascade based method. The classifiers were trained on a collection of 8,000 face images, which contained approximately 3,000 smiling faces. The comparison results are listed in Table 2.

TABLE 2

Comparison of smile detection performance on 1.6 G Hz Atom CPU, 1 G Memory

| Method | Feature | Dimension | Classifier | Size | Accuracy | Processing-speed (face-per-seeond) |
|---|---|---|---|---|---|---|
| Global-feature | Gabor energy response | 23040 | SVM | ~30 MB | 95.1% | 27 |
| Haar cascade | Haar/Box features | 322954 | Boosting decision tree | ~10 MB | 94.8% | 40 |
| Embodiments of the present invention | LBP in 20 pre-selected local regions | 59 in each local region | MLP | 400 KB | 96.1% | 800 |

Note the accuracy number in Table 2 is the "area-under-roc" curve accuracy, which is a standard metric for measuring detection performance. It is apparent that embodiments of the present invention are considerably more computing/memory efficient and accurate than two other known techniques. For a smile detector, the applicants also made a live comparison with digital camera/video recorder on several videos. The results showed that embodiments of the present invention can achieve a 98% hit-rate with only 1.6% false alarms; while that of known digital camera/digital video recorder (DC/DVR) (tuned with the highest sensitive level) only achieved a 80% hit-rate and more than 15% rate of false alarms.

For gender detection, the classifiers were trained on a collection of 17,700 face images, which contained about 8,100 female and 9,600 male faces. When embodiments of the present invention were applied to a FERET dataset with 1,024 faces, embodiments of the present invention achieved 94% accuracy with 140 fps on a processing system including a 1.6 G Hz Atom processor. The comparison results are shown in Table 3.

TABLE 3

Comparison of gender detection performance

| Method | Feature | Dimensions | Classifier | Accuracy |
|---|---|---|---|---|
| Global-feature | Pixel gray value | 2304 | SVM | 83.4% |
| Grid layout feature | LBP on 3×3 blocks and the whole region | 1083 | SVM | 79.2% |
| Embodiments of present invention | Dense HoG in 20 pre-selected local regions | 128 in each local region | MLP | 94.1% |

Embodiments of the present invention aggregate local region features instead of a global feature for facial attribute detection. The local regions are automatically selected by a boosting procedure to ensure maximum accuracy. The MLP weak classifiers are trained over each local feature. The results from the weak classifiers of each of the extracted local features are aggregated to produce the final detection result. The number of selected local regions is typically less than 20; and the boosting MLP classifier performance is not only accurate in prediction, but also very fast and small in size.

Embodiments of the present invention overcome disadvantages of the prior art in at least four aspects. First, embodiments of the present invention provide for aggregating results from weak classifiers on local features to produce a strong facial attribute detector. Second, relating to model size, the global features (such as Gabor) are usually of very high dimensions (the feature vector may be more than 23,000 dimensions), which makes the trained classifiers quite large in terms of storage (according to our reimplementation of a known technique, the SVM classifier size is more than 30 MB). In contrast, implementation of embodiments of the present invention for the local region feature has low dimensions (using LBP, only 59 dimensions for each weak classifier), and the trained classifier implementation size in one embodiment is less than 400 KB. The boosting cascade classifiers of the prior art usually take thousands of features and the classifier size is also quite large (>=10 MB in our reimplementation of a known technique). In contrast, implementation of embodiments of the present invention for the local-region based classifier is relatively stronger than a Haar-classifier; and the classifier size is much smaller. Third, the processing speed is better than prior approaches. Embodiments of the present invention can achieve real-time processing speed even on low-end Atom processors; while other known solutions cannot realize real-time processing speed even on high-end PCs.

Embodiments of the present invention comprise a unified solution for many facial attribute detection problems. Embodiments of the present invention may be broadly used in tasks like smile detection, gender detection, blink detection, age detection, etc.

Figure 9:
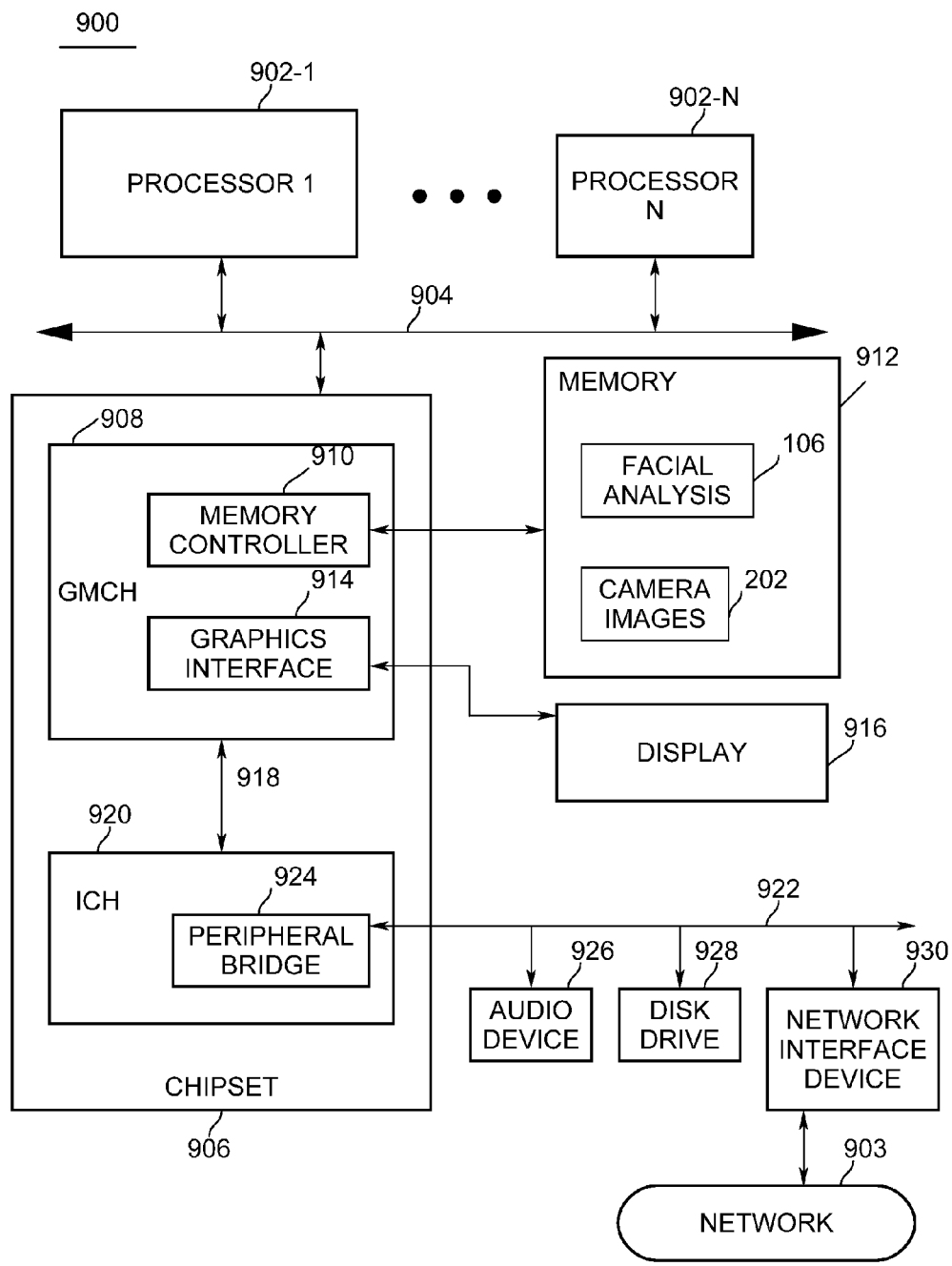
FIGS. 9 and 10 illustrate block diagrams of embodiments of processing systems, which may be utilized to implement some embodiments discussed herein.

FIG. 9 illustrates a block diagram of an embodiment of a processing system 900, in various embodiments, one or more of the components of the system 900 may be provided in various electronic computing devices capable of performing one or more of the operations discussed herein with reference to some embodiments of the invention. For example, one or more of the components of the processing system 900 may be used to perform the operations discussed with reference to FIGS. 1-8, e.g., by processing instructions, executing subroutines, etc. in accordance with the operations discussed herein. Also, various storage devices discussed herein (e.g., with reference to FIG. 9 and/or FIG. 10) may be used to store data, operation results, etc. In one embodiment, data received over the network 903 (e.g., via network interface devices 930 and/or 1030) may be stored in caches (e.g., L1 caches in an embodiment) present in processors 902 (and/or 1002 of FIG. 10). These processors may then apply the operations discussed herein in accordance with various embodiments of the invention.

More particularly, processing system 900 may include one or more processing unit(s) 902 or processors that communicate via an interconnection network 904. Hence, various operations discussed herein may be performed by a processor in some embodiments. Moreover, the processors 902 may include a general purpose processor, a network processor (that processes data communicated over a computer network 903, or other types of a processor (including a reduced instruction set computer (RISC) processor or a complex instruction set computer (CISC)). Moreover, the processors 902 may have a single or multiple core design. The processors 902 with a multiple core design may integrate different types of processor cores on the same integrated circuit (IC) die. Also, the processors 902 with a multiple core design may be implemented as symmetrical or asymmetrical multiprocessors. Moreover, the operations discussed with reference to FIGS. 1-8 may be performed by one or more components of the system 900. In an embodiment, a processor (such as processor 1 902-1) may comprise facial analysis component 106, and/or application 102 as hardwired logic (e.g., circuitry) or microcode. In an embodiment, multiple components shown in FIG. 9 may be included on a single integrated circuit (e.g., system on a chip (SOC).

A chipset 906 may also communicate with the interconnection network 904. The chipset 906 may include a graphics and memory control hub (GMCH) 908. The GMCH 908 may include a memory controller 910 that communicates with a memory 912. The memory 912 may store data, such as images 202 from camera 104. The data may include sequences of instructions that are executed by the processor 902 or any other device included in the processing system 900. Furthermore, memory 912 may store one or more of the programs such as facial analysis component 106, instructions corresponding to executables, mappings, etc. The same or at least a portion of this data (including instructions, camera images, and temporary storage arrays) may be stored in disk drive 928 and/or one or more caches within processors 902. In one embodiment of the invention, the memory 912 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 904, such as multiple processors and/or multiple system memories.

The GMCH 908 may also include a graphics interface 914 that communicates with a display 916. In one embodiment of the invention, graphics interface 914 may communicate with the display 916 via an accelerated graphics port (AGP). In an embodiment of the invention, the display 916 may be a flat panel display that communicates with the graphics interface 914 through, for example, a signal converter that translates a digital representation of an image stored in a storage device such as video memory or system memory into display signals that are interpreted and displayed by the display 916. The display signals produced by the interface 914 may pass through various control devices before being interpreted by and subsequently displayed on the display 916. In an embodiment, camera images, facial images, and indicators of smile, gender, age, or other facial attribute detection processed by facial analysis component 106 may be shown on the display to a user.

A hub interface 918 may allow the GMCH 908 and an input/output (I/O) control hub (ICH) 920 to communicate. The ICH 920 may provide an interface to I/O devices that communicate with the processing system 900. The ICH 920 may communicate with a link 922 through a peripheral bridge (or controller) 924, such as a peripheral component interconnect (PCI) bridge, a universal serial bus (USB) controller, or other types of peripheral bridges or controllers. The bridge 924 may provide a data path between the processor 902 and peripheral devices. Other types of topologies may be utilized. Also, multiple links may communicate with the ICH 920, e.g., through multiple bridges or controllers. Moreover, other peripherals in communication with the ICH 920 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), camera 104, or other devices.

The link 922 may communicate with an audio device 926, one or more disk drive(s) 928, and a network interface device 930, which may be in communication with the computer network 903 (such as the Internet, for example). In an embodiment, the device 930 may be a network interface controller (NIC) capable of wired or wireless communication. Other devices may communicate via the link 922. Also, various components (such as the network interface device 930) may communicate with be GMCH 908 in some embodiments of the invention. In addition, the processor 902, the GMCH 908, and/or the graphics interface 914 may be combined to form a single chip. In an embodiment, images 202, and/or facial analysis component 106 may be received from computer network 903. In an embodiment, the facial analysis component 106 may be a plug-in for a web browser executed by processor 902.

Furthermore, the processing system 900 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 928), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 900 may be arranged in a point-to-point (PtP) configuration such as discussed with reference to FIG. 10. For example, processors, memory, and/or input/output devices may be interconnected by a number of point-to-point interfaces.

Figure 10:
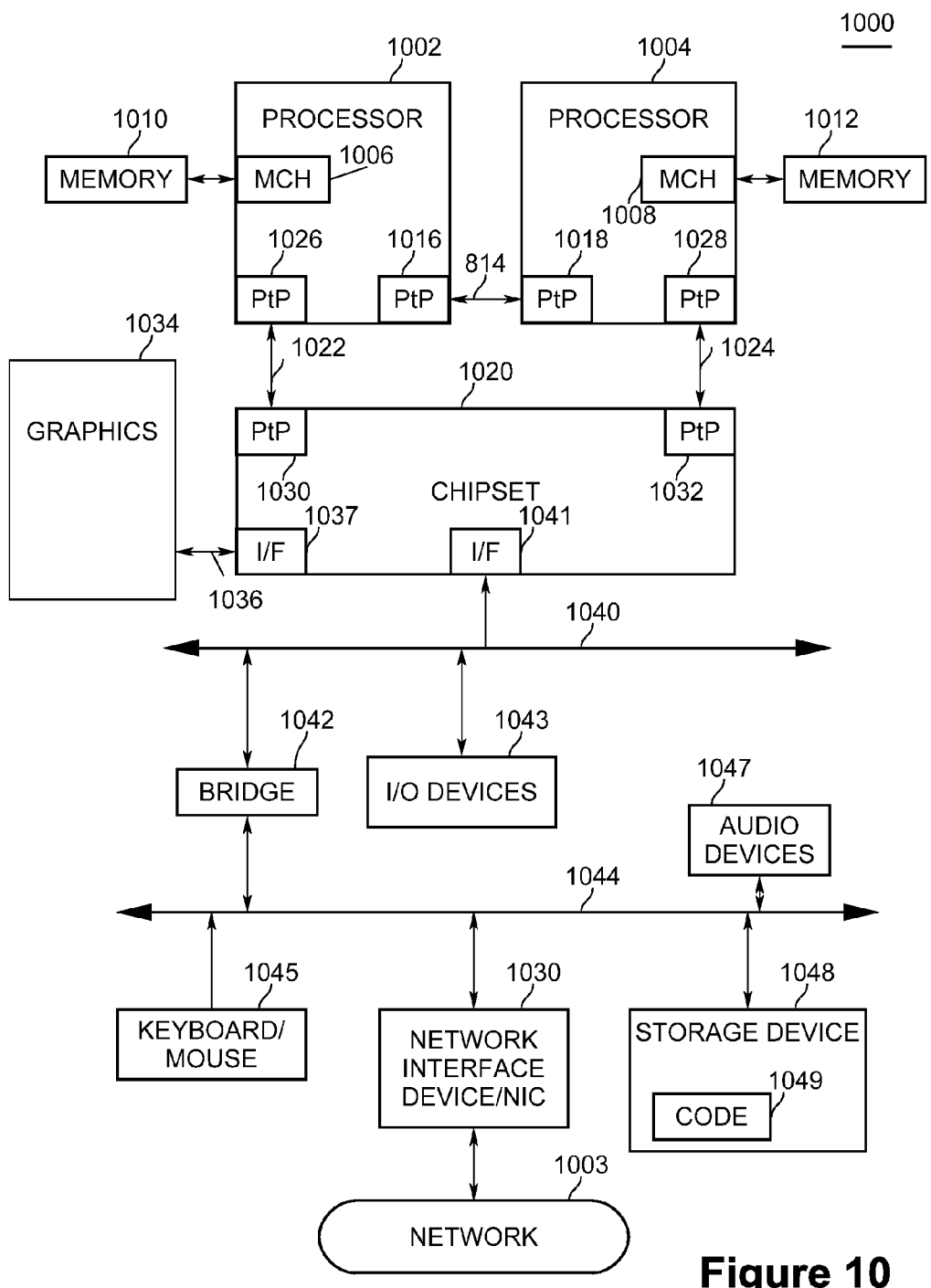

More specifically, FIG. 10 illustrates a processing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIGS. 1-8 may be performed by one or more components of the system 1000.

As illustrated in FIG. 10, the system 1000 may include multiple processors, of which only two, processors 1002 and 1004 are shown for clarity. The processors 1002 and 1004 may each include a local memory controller hub (MCH) 1006 and 1008 (which may be the same or similar to the GMCH 908 of FIG. 9 in some embodiments) to couple with memories 1010 and 1012. The memories 1010 and/or 1012 may store various data such as those discussed with reference to the memory 912 of FIG. 9.

The processors 1002 and 1004 may be any suitable processor such as those discussed with reference to processors 902 of FIG. 9. The processors 1002 and 1004 may exchange data via a point-to-point (PtP) interface 1014 using PtP interface circuits 1016 and 1018, respectively. The processors 1002 and 1004 may each exchange data with a chipset 1020 via individual PtP interfaces 1022 and 1024 using point to point interface circuits 1026, 1028, 1030, and 1032. The chipset 1020 may also exchange data with a high-performance graphics circuit 1034 via a high-performance graphics interlace 1036, using a PtP interface circuit 1037.

At least one embodiment of the invention may be provided by utilizing the processors 1002 and 1004. For example, the processors 1002 and/or 1004 may perform one or more of the operations of FIGS. 1-18. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may be coupled to a link 1040 using a PtP interface circuit 1041. The link 1040 may have one or more devices coupled to it, such as bridge 1042 and I/O devices 1043. Via link 1044, the bridge 1043 may be coupled to other devices such as a keyboard/mouse 1045, the network interface device 1030 discussed with reference to FIG. 9 (such as modems, network interface cards (NICs), or the like that may be coupled to the computer network 1003), audio I/O device 1047, and/or a data storage device 1048. The data storage device 1048 may store, in an embodiment, facial analysis component code 1049 that may be executed by the processors 1002 and/or 1004.

In various embodiments of the invention, the operations discussed herein, e.g., with reference to FIGS. 1-10, may be implemented as hardware (e.g., logic circuitry), software (including, for example, micro-code that controls the operations of a processor such as the processors discussed with reference to FIGS. 9 and 10), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate, or interact with each other.

Additionally, such computer-readable media may be downloaded as a computer program product, wherein the program may be transferred from a remote computer (e.g., a server) to a requesting computer (e.g., a client) by way of data signals, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method of detecting a facial attribute in an image comprising:
   detecting a face in the image to produce a facial image;
   detecting facial landmarks in the facial image;
   aligning and normalizing the facial image based at least in part on the detected facial landmarks to produce a normalized facial image;
   extracting a plurality of local features from selected local regions of the normalized facial image;
   predicting the facial attribute in each selected local region by inputting each selected local feature into one of a plurality of weak classifier components, each weak classifier component having a multi-layer perceptron (MLP) structure; and
   aggregating output data from each weak classifier component to generate an indication that the facial attribute is detected in the facial image.

2. The method of claim 1, wherein the facial attribute is a smile.

3. The method of claim 1, wherein the facial attribute is gender.

4. The method of claim 1, wherein the facial attribute is age.

5. The method of claim 1, wherein aligning and normalizing the facial image comprises converting the facial image to gray scale, aligning the facial image using the detected facial landmarks, and normalizing the gray scale aligned facial image to a predetermined size to produce the normalized facial image, the predetermined size being less than the size of the facial image.

6. The method of claim 1, wherein the local features are represented as a Local Binary Patterns (LBP) histogram.

7. The method of claim 1, wherein the local features are represented as a Histogram of oriented Gradients (HoG).

8. The method of claim 1, further comprising sliding a size-scalable window over the normalized facial image to generate candidate local regions, and selecting a subset of the candidate local regions as selected local regions.

9. The method of claim 1, further comprising training a classifier to perform the weak classification for each extracted local feature.

10. A processing system to perform image analysis processing, comprising:
    a face detection component to analyze an image to detect a face in the image;
    a facial landmark detection component to analyze the facial image to detect facial landmarks;
    an aligning and normalizing component to align and normalize the facial image based at least in part on the detected facial landmarks to produce a normalized facial image;
    an extraction component to extract a plurality of local features from selected local regions of the normalized facial image;
    a prediction component to predict the facial attribute in each selected local region by inputting each selected local feature into one of a plurality of weak classifier components, each weak classifier component having a multi-layer perceptron (MLP) structure; and an aggregation component to output data from each weak classifier component to generate an indication that the facial attribute is detected in the facial image.

11. The processing system of claim 10, wherein the facial attribute is a smile.

12. The processing system of claim 10, wherein the facial attribute is gender.

13. The processing system of claim 10, wherein aligning and normalizing component is adapted to convert the facial image to gray scale, align the facial image using the detected facial landmarks, and normalize the gray scale aligned facial image to a predetermined size to produce the normalized facial image, the predetermined size being less than the size of the facial image.

14. The processing system of claim 10, wherein the local features are represented as a Local Binary Patterns (LBP) histogram.

15. The processing system of claim 10, wherein the local features are represented as a Histogram of oriented Gradients (HoG).

16. The processing system of claim 10, wherein the extraction component is adapted to slide a size-scalable window over the normalized facial image to generate candidate local regions, and select a subset of the candidate local regions as selected local regions.

17. A processing system to perform image analysis processing, comprising:
   a camera to capture an image;
   a face detection component to analyze the image to detect a face in the image;
   a facial landmark detection component to analyze the facial image to detect facial landmarks;
   an aligning and normalizing component to align and normalize the facial image based at least in part on the detected facial landmarks to produce a normalized facial image;
   an extraction component to extract a plurality of local features from selected local regions of the normalized facial image;
   a prediction component to predict the facial attribute in each selected local region by inputting each selected local feature into one of a plurality of weak classifier components, each weak classifier component having a multi-layer perceptron (MLP) structure;
   an aggregation component to output data from each weak classifier component to generate an indication that the facial attribute is detected in the facial image; and
   a display to show the image and the indication.

18. The processing system of claim 17, wherein the facial attribute is a smile.

19. The processing system of claim 17, wherein the facial attribute is gender.

20. The processing system of claim 17, wherein the local features are represented as a Local Binary Patterns (LBP) histogram.

21. The processing system of claim 17, wherein the local features are represented as a Histogram of oriented Gradients (HoG).

22. Non-transitory computer-readable instructions arranged, when executed, to implement a method or realize an apparatus having:
   a facial landmark detection component to analyze the facial image to detect facial landmarks;
   an aligning and normalizing component to align and normalize the facial image based at least in part on the detected facial landmarks to produce a normalized facial image;
   an extraction component to extract a plurality of local features from selected local regions of the normalized facial image;
   a prediction component to predict the facial attribute in each selected local region by inputting each selected local feature into one of a plurality of weak classifier components, each weak classifier component having a multi-layer perceptron (MLP) structure; and
   an aggregation component to output data from each weak classifier component to generate an indication that the facial attribute is detected in the facial image.

23. Non-transitory computer-readable storage storing machine-readable instructions as claimed in claim 22.

* * * * *

UNITED STATES PATENT AND TRADEMARK OFFICE
CERTIFICATE OF CORRECTION

PATENT NO. : 8,805,018 B2
APPLICATION NO. : 13/997310
DATED : August 12, 2014
INVENTOR(S) : Li et al.

It is certified that error appears in the above-identified patent and that said Letters Patent is hereby corrected as shown below:

In the Claims

Column 13
Lines 8-9, Claim 13, "…,wherein aligning and normalizing component…" should read - …, wherein the aligning and normalizing component…

Signed and Sealed this
Twelfth Day of May, 2015

Michelle K. Lee
*Director of the United States Patent and Trademark Office*